US012617316B2

(12) United States Patent (10) Patent No.: US 12,617,316 B2
Kim et al. (45) Date of Patent: May 5, 2026

(54) GET ON AND OFF GUIDE DEVICE OF SEAT FOR VEHICLE

(71) Applicants:Hyundai Motor Company, Seoul (KR); Kia Corporation, Seoul (KR)

(72) Inventors: Mu Young Kim, Osan-si (KR); Suk Won Hong, Bucheon-si (KR); Hee Dong Choi, Hwaseong-si (KR); Seok Ju Gim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 309 days.

(21) Appl. No.: 18/608,137

(22) Filed: Mar. 18, 2024

(65) Prior Publication Data

US 2025/0153613 A1 May 15, 2025

(30) Foreign Application Priority Data

Nov. 10, 2023 (KR) ........................ 10-2023-0154948

(51) Int. Cl.
| | |
|---|---|
| *B60N 2/14* | (2006.01) |
| *B60N 2/02* | (2006.01) |
| *B60N 2/06* | (2006.01) |
| *B60N 2/10* | (2006.01) |

(52) U.S. Cl.
CPC ..... *B60N 2/02253* (2023.08); *B60N 2/02258* (2023.08); *B60N 2/06* (2013.01); *B60N 2/10* (2013.01); *B60N 2/14* (2013.01)

(58) Field of Classification Search
CPC ... B60N 2/10; B60N 2/12; B60N 2/14; B60N 2/06; B60N 2/02253; B60N 2/02258
See application file for complete search history.

(56) References Cited

U.S. PATENT DOCUMENTS

| | | | | |
|---|---|---|---|---|
| 4,846,529 | A * | 7/1989 | Tulley ................ | B60N 2/02246 |
| | | | | 297/DIG. 10 |
| 5,042,864 | A * | 8/1991 | Mochizuki ............... | B60N 2/14 |
| | | | | 248/416 |
| 8,033,605 | B2 * | 10/2011 | Miura .................. | B60N 2/2893 |
| | | | | 297/344.14 |
| 8,827,367 | B2 * | 9/2014 | Hibi ......................... | B60N 2/12 |
| | | | | 297/344.23 |
| 10,076,976 | B2 * | 9/2018 | Roeglin ................. | B60N 2/146 |
| 10,773,610 | B2 * | 9/2020 | Kim .......................... | B60N 2/34 |
| 11,904,736 | B2 * | 2/2024 | Aktas ....................... | B60N 2/14 |
| 11,951,880 | B2 * | 4/2024 | Lohar ....................... | B60N 2/18 |
| 11,964,595 | B2 * | 4/2024 | Seibold .................... | B60N 2/14 |
| 12,065,061 | B2 * | 8/2024 | Lemay .................. | B60N 2/146 |
| 12,128,799 | B2 * | 10/2024 | Kim .......................... | B60N 2/36 |
| 12,162,379 | B2 * | 12/2024 | Dillinger .................. | B60N 2/43 |
| 12,503,015 | B2 * | 12/2025 | Ito ............................. | B60N 2/06 |

(Continued)

*Primary Examiner* — Philip F Gabler
(74) *Attorney, Agent, or Firm* — Slater Matsil, LLP

(57) ABSTRACT

In an embodiment of a vehicle seat device for assistance in entering and exiting a vehicle, the vehicle seat device includes an integrated assistance device mounted on a seat swivel device and configured to perform a seat relaxation operation and a seat assistance operation of allowing a passenger to enter and exit the vehicle, thereby not only implementing a relaxation posture of a seat, but also allowing the passenger to conveniently enter and exit the vehicle through a seat swivel operation and a seat operation for assistance in entering and exiting the vehicle.

19 Claims, 10 Drawing Sheets

(56)            References Cited

U.S. PATENT DOCUMENTS

| | | | | |
|---|---|---|---|---|
| 12,503,016 | B2 * | 12/2025 | Napau | B60N 2/1615 |
| 2007/0222267 | A1 * | 9/2007 | Tsujimoto | F16H 37/126 |
| | | | | 297/344.24 |

* cited by examiner

- SEAT FORWARD MOVEMENT -

- SEAT SWIVEL -

- POSITION FOR ASSISTANCE IN
ENTERING AND EXITING VEHICLE -

GET ON AND OFF GUIDE DEVICE OF SEAT FOR VEHICLE

CROSS-REFERENCE TO RELATED APPLICATIONS

This application claims the benefit of Korean Patent Application No. 10-2023-0154948, filed on Nov. 10, 2023, which application is hereby incorporated herein by reference.

TECHNICAL FIELD

The present disclosure relates to a vehicle seat device.

BACKGROUND

In general, a vehicle seat includes basic components such as a seat cushion configured to allow the lower body of a passenger to be seated thereon, a seatback configured to support the upper body of a passenger, and a headrest configured to support the neck and the head of a passenger. In addition to the basic components, various seat position adjustment devices and convenience devices are installed inside and outside the vehicle seat.

Further, it is required to provide a mechanism mounted on a vehicle seat and configured to implement a relaxation posture in an autonomous vehicle and an electric vehicle. For example, when an autonomous vehicle travels a long distance, the mechanism enables a driver to comfortably rest or sleep. Additionally, when it takes a long time to charge an electric vehicle, the mechanism enables a driver to comfortably rest during charging of the electric vehicle.

In addition, a mechanism capable of performing assistance in entering and exiting the vehicle is installed on a vehicle seat to allow the elderly and the disabled to conveniently enter and exit the vehicle.

However, as described above, it is required to separately install, on the vehicle seat, a mechanism component adopted to implement a relaxation posture and a mechanism component adopted to assist in entering and exiting the vehicle. Accordingly, the internal structure of the vehicle seat becomes very complicated, and weight and the number of parts of the vehicle are increased, which leads to deterioration in seat assembly performance.

The above information disclosed in this Background section is only for enhancement of understanding of the background of the present disclosure, and therefore it may contain information that does not form the prior art that is already publicly known or publicly used.

SUMMARY

The present disclosure relates to a vehicle seat device for assistance in entering and exiting a vehicle. More particularly, the present disclosure relates to a vehicle seat device configured not only to perform a relaxation operation of a seat, but also to allow a passenger to conveniently enter and exit the vehicle through a seat swivel operation and a seat operation for assistance in entering and exiting the vehicle.

Embodiments of the present disclosure can solve the above-described problems associated with the prior art, and it can be an advantage of an embodiment of the present disclosure to provide a vehicle seat device for assistance in entering and exiting a vehicle, the vehicle seat device including an integrated assistance device mounted on a seat swivel device and configured to perform a seat relaxation operation and a seat assistance operation of allowing a passenger to enter and exit the vehicle, thereby not only implementing a relaxation posture of a seat, but also allowing the passenger to conveniently enter and exit the vehicle through a seat swivel operation and a seat operation for assistance in entering and exiting the vehicle.

In an embodiment, a vehicle seat device for assistance in entering and exiting a vehicle includes a first side bracket and a second side bracket respectively mounted on opposite sides of a rotating plate of a seat swivel device, a first guidance link having a lower end coupled to a front portion of the first side bracket to be movable forwards and rearwards, a drive link having a first hinge coupling end hinged to a position of a rear inner surface of the first side bracket by a hinge pin, a driven link having a second hinge coupling end hinged to a position of a rear outer surface of the first side bracket by the hinge pin, a tilting link having a front end hinged to an upper end of the first guidance link and a rear end connected to the driven link, a guidance plate having a guidance hole formed to have a sector gear on one inner surface thereof, the guidance plate being fixedly mounted at the position of the rear outer surface of the first side bracket, and a drive device connected to the drive link, the guidance plate, and the driven link to rotate the drive link, the driven link, and the tilting link forwards or rearwards around the hinge pin.

In an embodiment, the first side bracket may have a first slide hole formed at a selected, set, preset, or predetermined position of a front portion thereof and configured to allow a first guidance pin mounted on a lower end of the first guidance link to be coupled thereto, wherein the first guidance pin may be movable forwards and rearwards in the first slide hole.

In an embodiment, the first hinge coupling end may be formed at a front end of the drive link, the second hinge coupling end may be formed at a front end of the driven link, and the first hinge coupling end of the drive link and the second hinge coupling end of the driven link may be hinged to each other by the hinge pin with the first side bracket interposed therebetween.

In an embodiment, the driven link may have a seat cushion connection end formed at a rear end thereof and coupled to a connection pipe mounted on a rear end of a seat cushion frame, and the driven link may have a tilting link connection end formed at an upper end thereof and configured to allow a rear end of the tilting link to be fixedly mounted thereon by a fixing pin.

In an embodiment, the drive device may include a motor mounted on an inner surface of the drive link, a drive shaft formed to extend from an output portion of the motor, wherein the drive shaft passes through the guidance hole of the guidance plate and is rotatably coupled to the driven link, and a pinion mounted on the drive shaft and engaged with the sector gear of the guidance plate.

In an embodiment, the drive link may have a guidance hole formed to allow the drive shaft to pass therethrough, and the driven link may have a connection hole formed to allow an end of the drive shaft to be rotatably inserted thereinto.

In an embodiment, the vehicle seat device may further include a second guidance link having a lower part coupled to a selected, set, preset, or predetermined position of a front portion of the second side bracket, wherein the lower part is coupled thereto to be movable forwards and rearwards, and an upper part hinged to a side of the seat cushion frame.

In an embodiment, the second side bracket may have a second slide hole formed at a selected, set, preset, or predetermined position of a front portion thereof, wherein the second guidance link may have a second guidance pin mounted on a lower end thereof and coupled to the second slide hole, wherein the second guidance pin may be movable forwards and rearwards in the second slide hole.

In an embodiment, each of the first side bracket and the second side bracket may be fixedly mounted on a corresponding one of opposite sides of a base frame mounted on the rotating plate of the seat swivel device, and the seat swivel device may be mounted on a seat rail to be movable forwards and rearwards along the seat rail.

It can be understood that the terms "vehicle", "vehicular", and other similar terms as used herein are inclusive of motor vehicles in general, such as passenger automobiles including sport utility vehicles (SUV), buses, trucks, various commercial vehicles, farm tractors, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

BRIEF DESCRIPTION OF THE DRAWINGS

The above and other features and advantages of embodiments of the present disclosure will now be described in detail with reference to certain example embodiments illustrated in the accompanying drawings, which are given hereinbelow by way of illustration only, and thus are not necessarily limitative of the present disclosure, and wherein.

4

Figure 10:
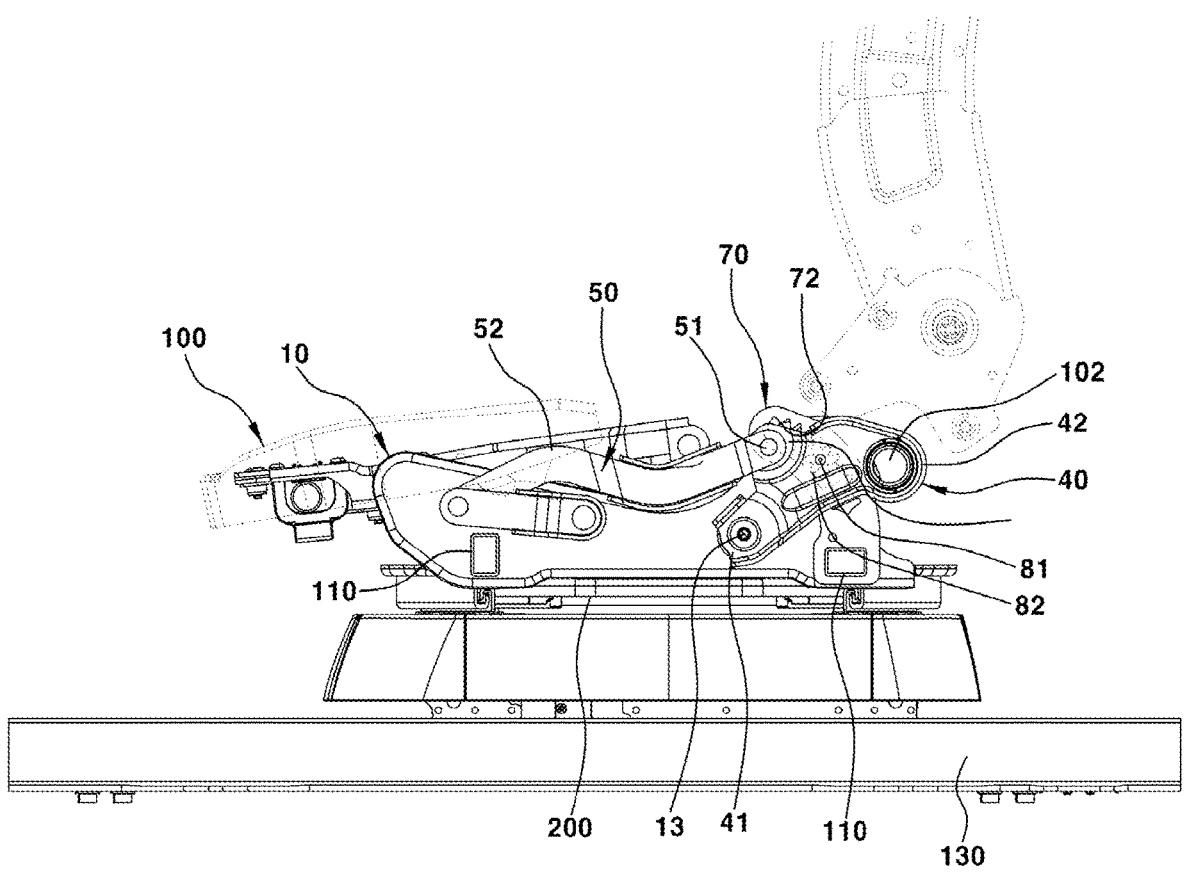
Figure 11:
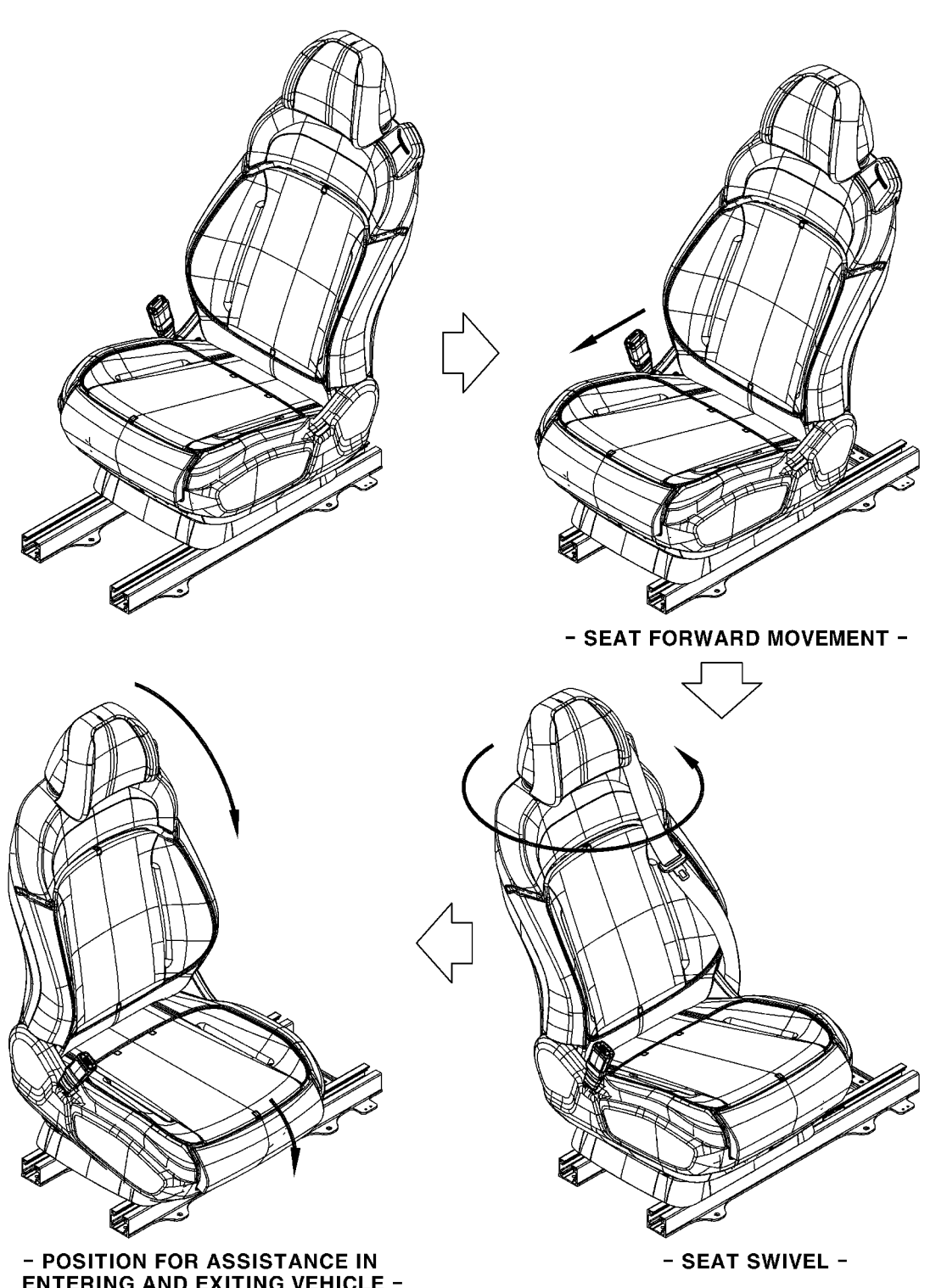

FIG. 10 is a side view showing an operation of implementing a seat posture for assistance in entering and exiting the vehicle by the vehicle seat device for assistance in entering and exiting the vehicle according to an embodiment of the present disclosure; and FIG. 11 is a schematic diagram showing an operation sequence of the vehicle seat device for assistance in entering and exiting the vehicle according to an embodiment of the present disclosure.

It can be understood that the appended drawings are not necessarily to scale, presenting a somewhat simplified representation of various features illustrative of an embodiment of the present disclosure. The specific design features of an embodiment of the present disclosure as disclosed herein, including, for example, specific dimensions, orientations, locations, and shapes can be determined in part by the particular intended application and use environment, for example.

In the figures, reference numbers can refer to same or equivalent parts of the present disclosure throughout the several figures.

DETAILED DESCRIPTION OF ILLUSTRATIVE EMBODIMENTS

Specific structural or functional descriptions given in connection with embodiments of the present disclosure are merely illustrative for the purpose of describing embodiments of the present disclosure, and embodiments of the present disclosure may be implemented in various forms. Further, it can be understood that the present description is not intended to necessarily limit the disclosure to the embodiments illustrated. On the contrary, the present disclosure is intended to cover not only some example embodiments, but also various alternatives, modifications, equivalents, and other embodiments, which may be included within the spirit and scope of the present disclosure as defined by the appended claims.

In the present disclosure, terms such as "first" and/or "second" may be used to describe various components, but the components are not necessarily limited by such terms. Such terms can be used merely for the purpose of distinguishing one component from other components. For example, a first component may be referred to as a second component, and similarly, a second component may also be referred to as a first component without departing from the scope of rights according to the present disclosure.

When one component is referred to as being "connected" or "joined" to another component, the one component may be directly connected or joined to the other component, but it can be understood that other components may be present therebetween. On the other hand, when the one component is referred to as being "directly connected to" or "directly in contact with" the other component, it can be understood that other components are not present therebetween. Other expressions for the description of relationships between components, such as "between" and "directly between" or "adjacent to" and "directly adjacent to", can be interpreted in the same manner.

Same reference numerals can represent the same components throughout the specification. Additionally, the terms in this specification can be used merely to describe embodiments, and are not intended to necessarily limit the present disclosure. In this specification, an expression in a singular form can also include a plural form, unless clearly specified otherwise in context. As used herein, expressions such as "comprise" and/or "comprising" do not exclude the presence or addition of one or more components, steps, operations, and/or elements other than those described.

Figure 1:
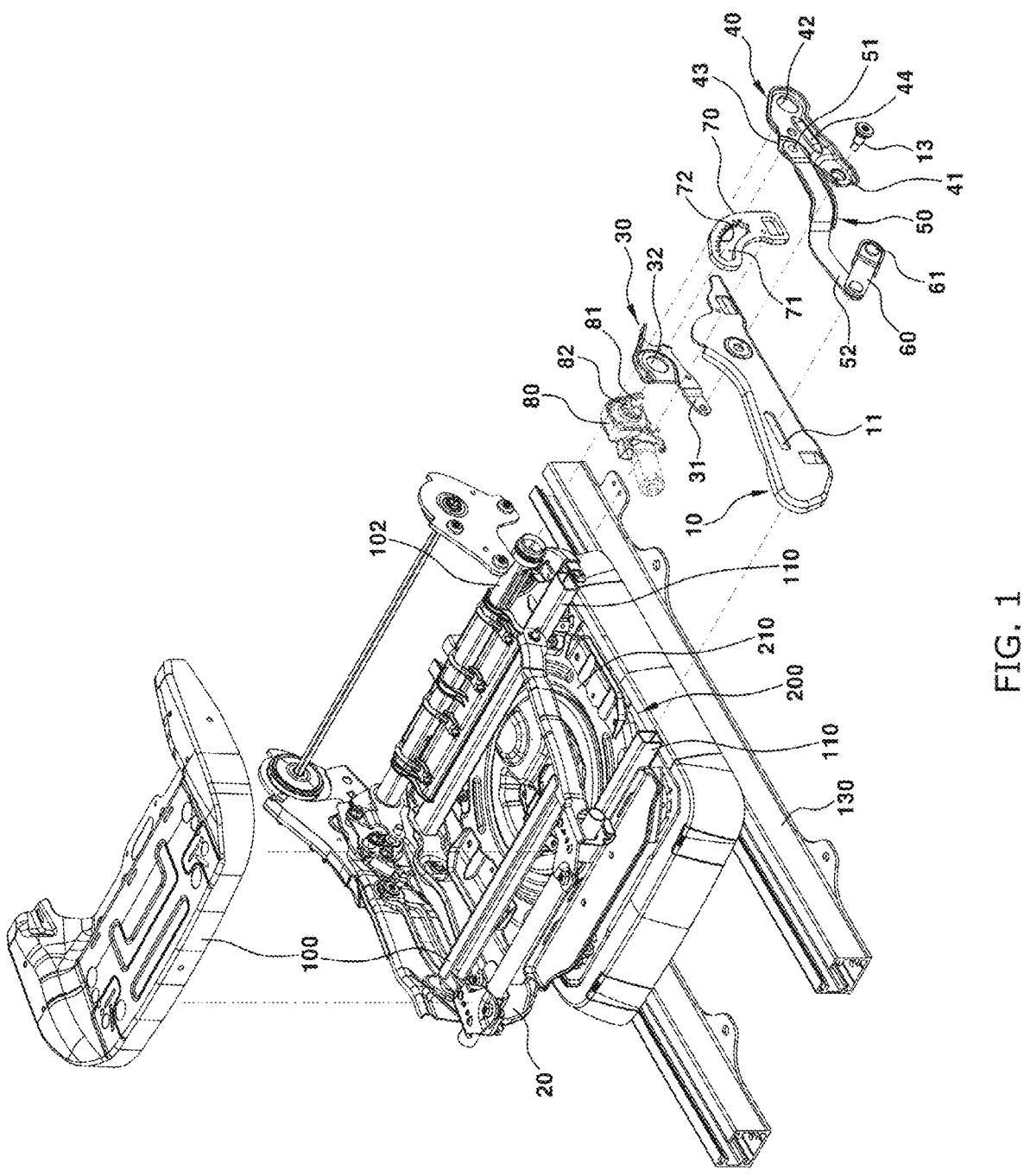
FIG. 1 is an exploded perspective view showing a vehicle seat device for assistance in entering and exiting a vehicle according to an embodiment of the present disclosure.
Figure 6:
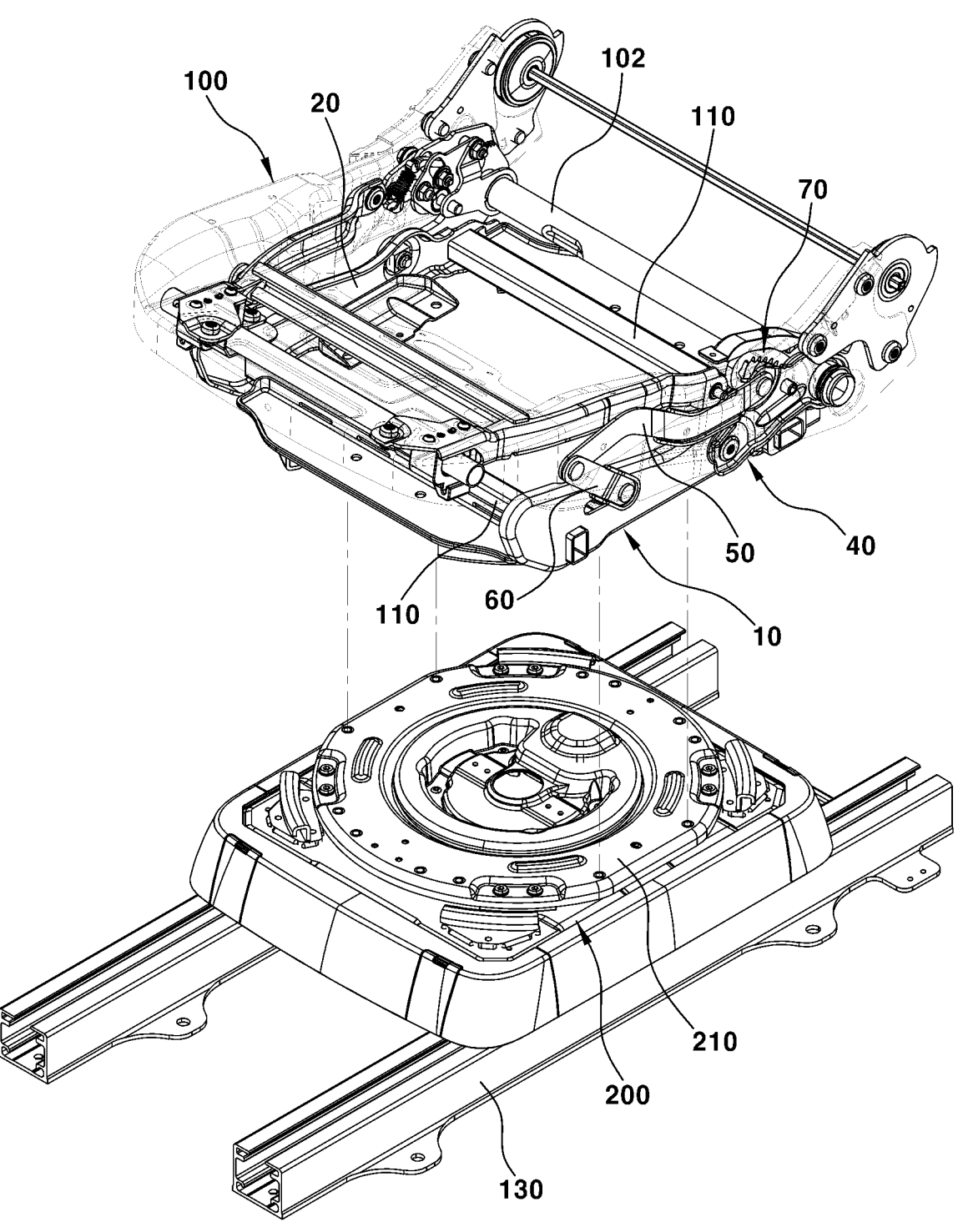
FIG. 6 is an exploded perspective view showing a state in which the vehicle seat device for assistance in entering and exiting the vehicle according to an embodiment of the present disclosure is not assembled on a seat swivel device.
Figure 7:
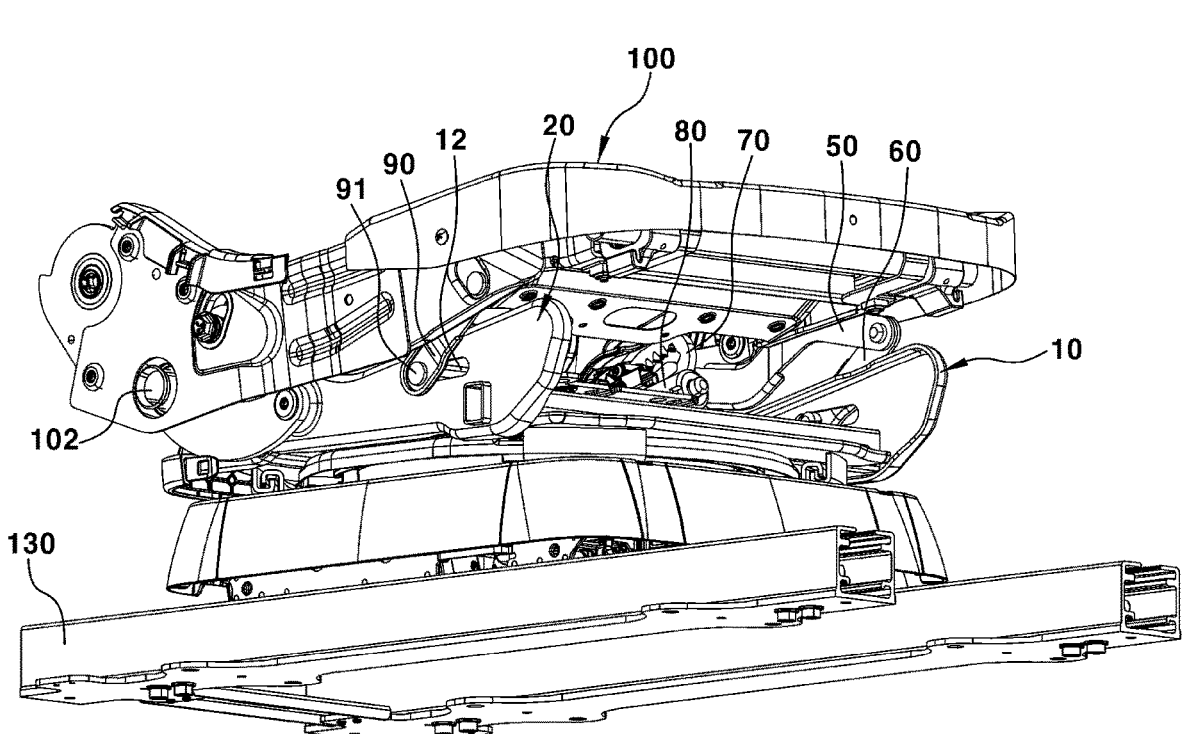
FIG. 7 is a perspective view showing a state in which the vehicle seat device for assistance in entering and exiting the vehicle according to an embodiment of the present disclosure is assembled on the seat swivel device.

Referring to FIGS. 1, 6, and 7, a first side bracket 10 and a second side bracket 20 can be mounted on a rotating plate 210 of a seat swivel device 200.

More specifically, the first side bracket 10 and the second side bracket 20 can be fixedly mounted on the opposite sides of a base frame 110 mounted on the rotating plate 210 of the seat swivel device 200.

The seat swivel device 200 can be mounted on a seat rail 130 to be movable forwards and rearwards along the seat rail 130.

For reference, the seat swivel device 200 may use any seat swivel device including a mechanism configured to rotate a seat.

Figure 2:
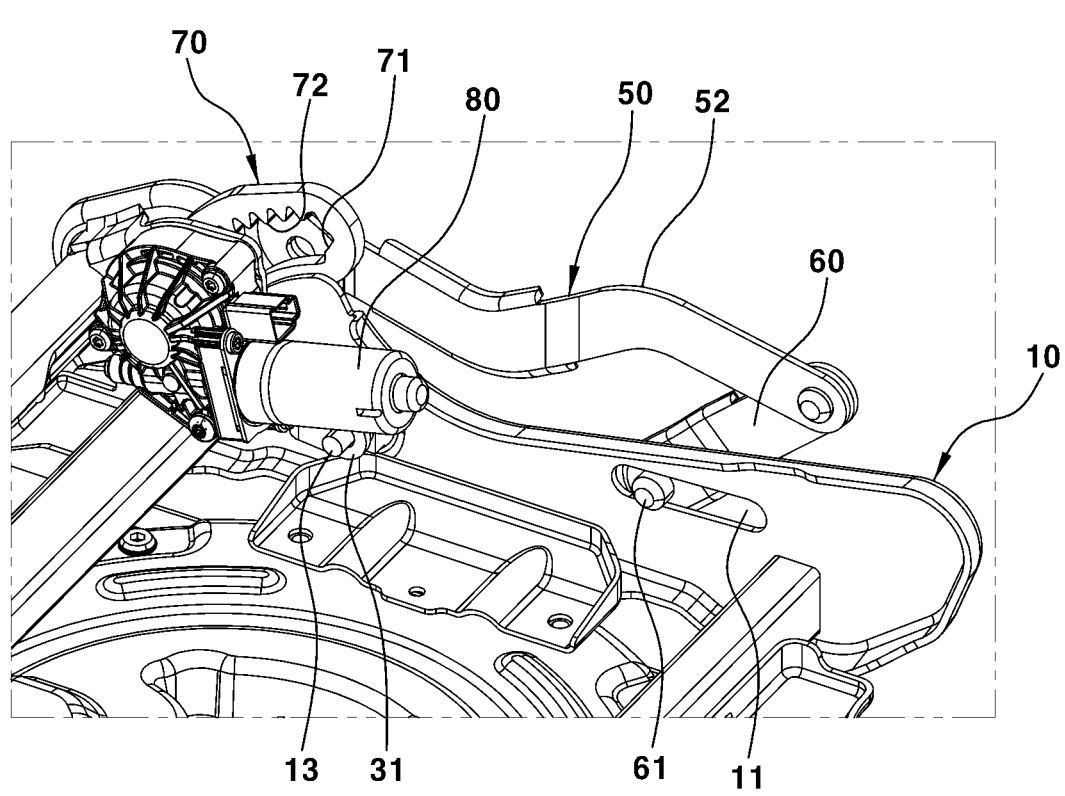
FIG. 2 is an enlarged perspective view of a main part of the vehicle seat device for assistance in entering and exiting the vehicle according to an embodiment of the present disclosure, as seen from the inside.
Figure 3:
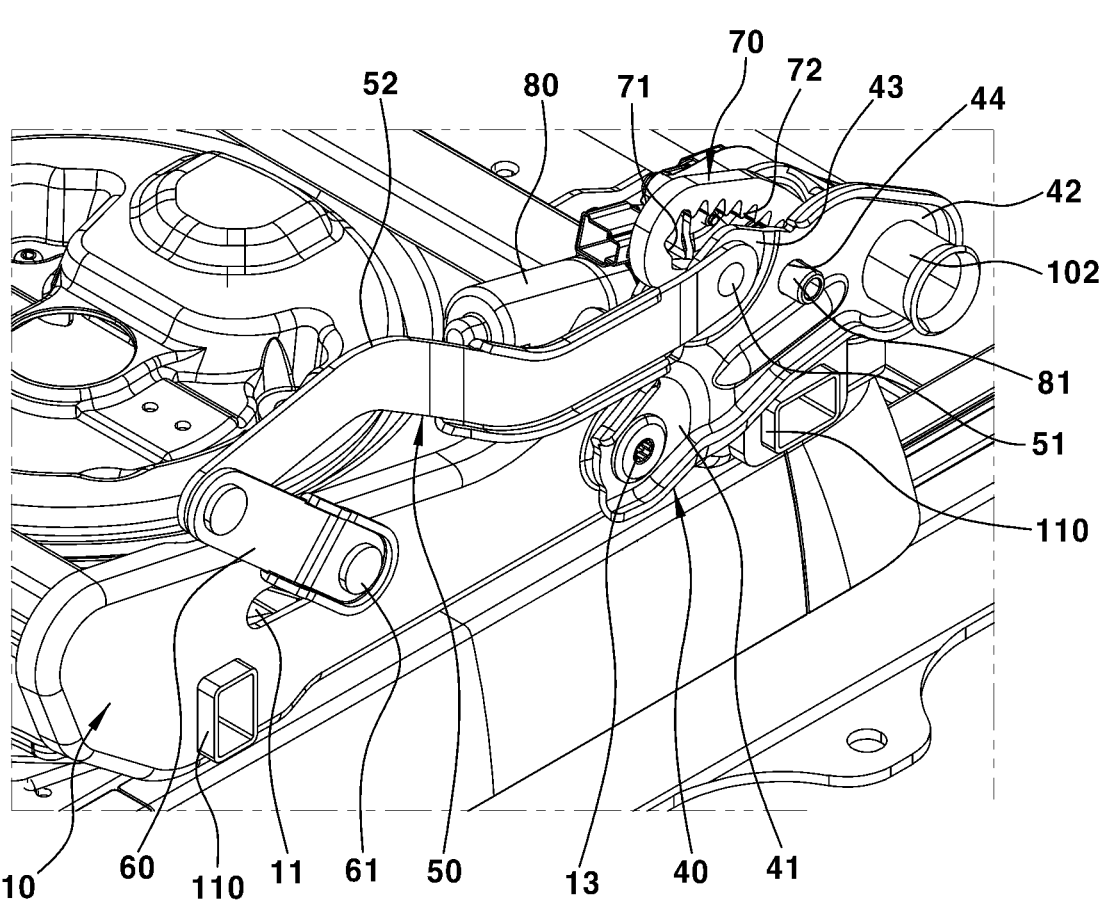
FIG. 3 is an enlarged perspective view of the main part of the vehicle seat device for assistance in entering and exiting the vehicle according to an embodiment of the present disclosure, as seen from the outside.

Referring to FIGS. 1, 2, and 3, a lower end of a first guidance link 60 can be coupled to a front portion of the first side bracket 10 to be movable forwards and rearwards.

The first side bracket 10 can have a first slide hole 11 formed at a selected, set, preset, or predetermined position of a front portion thereof and configured to allow a first guidance pin 61 mounted on the lower end of the first guidance link 60 to be slidably coupled thereto to be movable forwards and rearwards in the first slide hole 11.

The front end of a tilting link 50 can be hinged to the upper end of the first guidance link 60.

The front end of a drive link 30 can be hinged to the rear inner surface of the first side bracket 10 by a hinge pin 13, and the front end of a driven link 40 can be hinged to the rear outer surface of the first side bracket 10 by the hinge pin 13.

A first hinge coupling end 31 can be formed to protrude from the front end of the drive link 30, and a second hinge coupling end 41 can be formed to protrude from the front end of the driven link 40.

Figure 4:
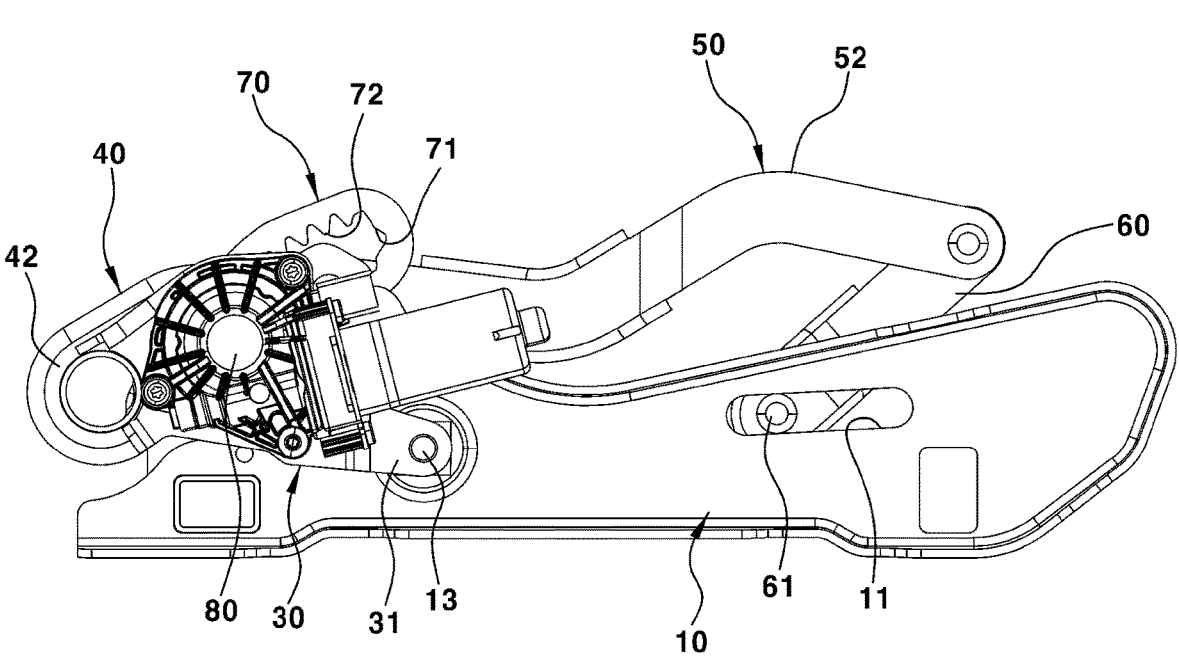
FIG. 4 is a side view of the vehicle seat device for assistance in entering and exiting the vehicle according to the present disclosure, as seen from the inside.
Figure 5:
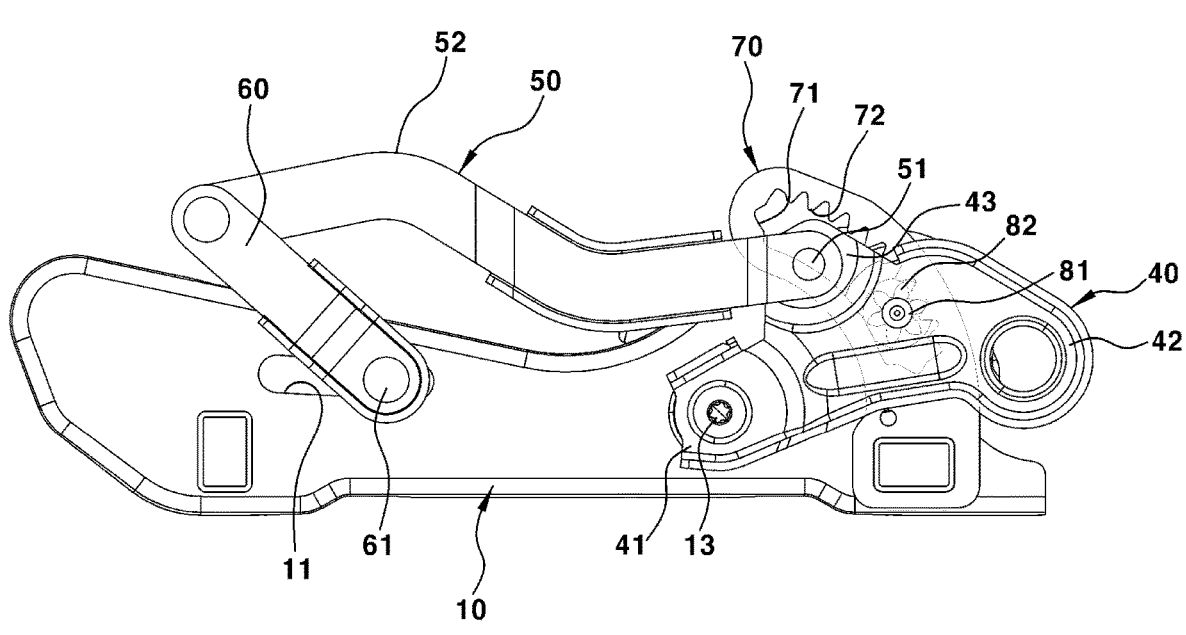
FIG. 5 is a side view of the vehicle seat device for assistance in entering and exiting the vehicle according to an embodiment of the present disclosure, as seen from the outside.

Accordingly, referring to FIG. 4, the first hinge coupling end 31 of the drive link 30 can be hinged to a selected, set, preset, or predetermined position of the rear inner surface of the first side bracket 10 by the hinge pin 13, and referring to FIG. 5, the second hinge coupling end 41 of the driven link 40 can be hinged to a selected, set, preset, or predetermined position of the rear outer surface of the first side bracket 10 by the hinge pin 13.

The first hinge coupling end 31 of the drive link 30 and the second hinge coupling end 41 of the driven link 40 can be hinged to be rotatable in the forward-and-rearward direction by a single hinge pin 13 with the first side bracket 10 interposed therebetween.

In addition, a seat cushion connection end 42 can be formed at the rear end of the driven link 40 and can be coupled to a connection pipe 102 mounted on the rear end of a seat cushion frame 100, and a tilting link connection end 43 can be formed at the upper end of the driven link 40, in which the rear end of the tilting link 50 can be mounted on the tilting link connection end 43 by a fixing pin 51.

The tilting link 50 can have a long bar structure in the forward-and-rearward direction and can have an upwardly convex support portion 52 formed in the middle portion thereof and configured to support the bottom of the seat cushion frame 100. As described above, the front end of the tilting link 50 can be hinged to the upper end of the first guidance link 6o, and the rear end of the tilting link 50 can be connected to the tilting link connection end 43 of the driven link 40 by the fixing pin 51.

A guidance plate 70 can have a sector gear 72 formed therein and can be mounted on the rear outer surface of the first side bracket 10, and the guidance plate 70 can be located between the outer surface of the first side bracket 10 and the inner surface of the driven link 40.

More specifically, the guidance plate 70 can have a vertically long guidance hole 71 formed at the upper portion thereof, and the sector gear 72 can be formed on one inner surface of the guidance hole 71. Further, the lower end of the guidance plate 70 provided as described above can be fixedly mounted at a position of the rear outer surface of the first side bracket 10.

Particularly, a drive device configured to rotate the drive link 30, the driven link 40, and the tilting link 50 forwards or rearwards around the hinge pin 13 can be mounted across the drive link 30, the guidance plate 70, and the driven link 40.

The drive device may include a motor 80 mounted on the inner surface of the drive link 30, a drive shaft 81 can be formed to extend from an output portion of the motor 80, configured to pass through the drive link 30 and the guidance hole 71 of the guidance plate 70, and rotatably coupled to the driven link 40. A pinion 82 can be mounted on the drive shaft 81 and engaged with the sector gear 72 formed in the guidance hole 71 of the guidance plate 70.

Referring to FIG. 1, the drive link 30 can have a guidance hole 32 formed to allow the drive shaft 81 to pass therethrough, and the driven link 40 can have a connection hole 44 formed to allow the end of the drive shaft 81 to be rotatably inserted thereinto.

Referring to FIG. 7, the vehicle seat device for assistance in entering and exiting the vehicle according to an embodiment of the present disclosure further includes a second guidance link 90 having a lower part coupled to a selected, set, preset, or predetermined position of a front portion of the second side bracket 20 to be movable forwards and rearwards and an upper part hinged to the side of the seat cushion frame 100.

A second slide hole 12 can be formed at a selected, set, preset, or predetermined position of a front portion of the second side bracket 20. The second guidance link 90 can have a second guidance pin 91 mounted on the lower end thereof and coupled to the second slide hole 12 to be movable forwards and rearward therein.

Hereinafter, a description will be given as to an operational flow of the vehicle seat device for assistance in entering and exiting the vehicle according to an embodiment of the present disclosure having the above-described configuration.

Operation of Implementing Relaxation Posture

Figure 8:
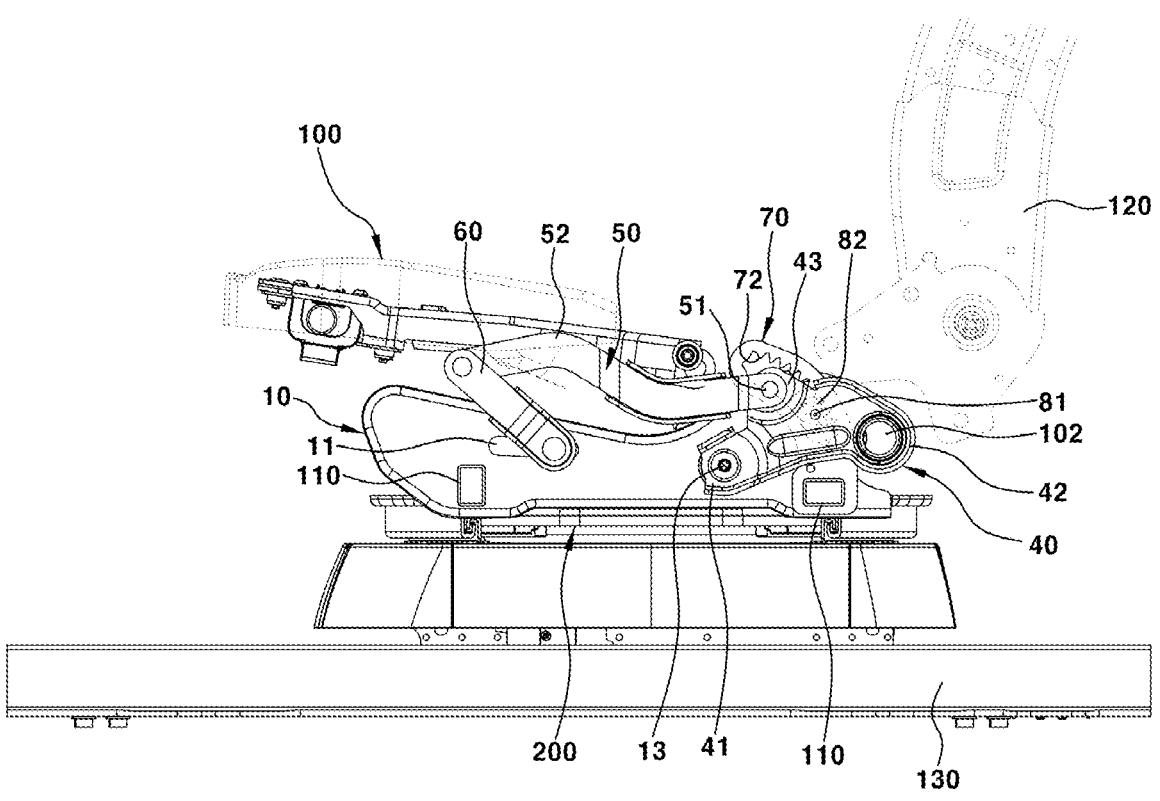
FIG. 8 is a side view showing a state in which the vehicle seat device for assistance in entering and exiting the vehicle according to an embodiment of the present disclosure is in a first configuration.
Figure 9:
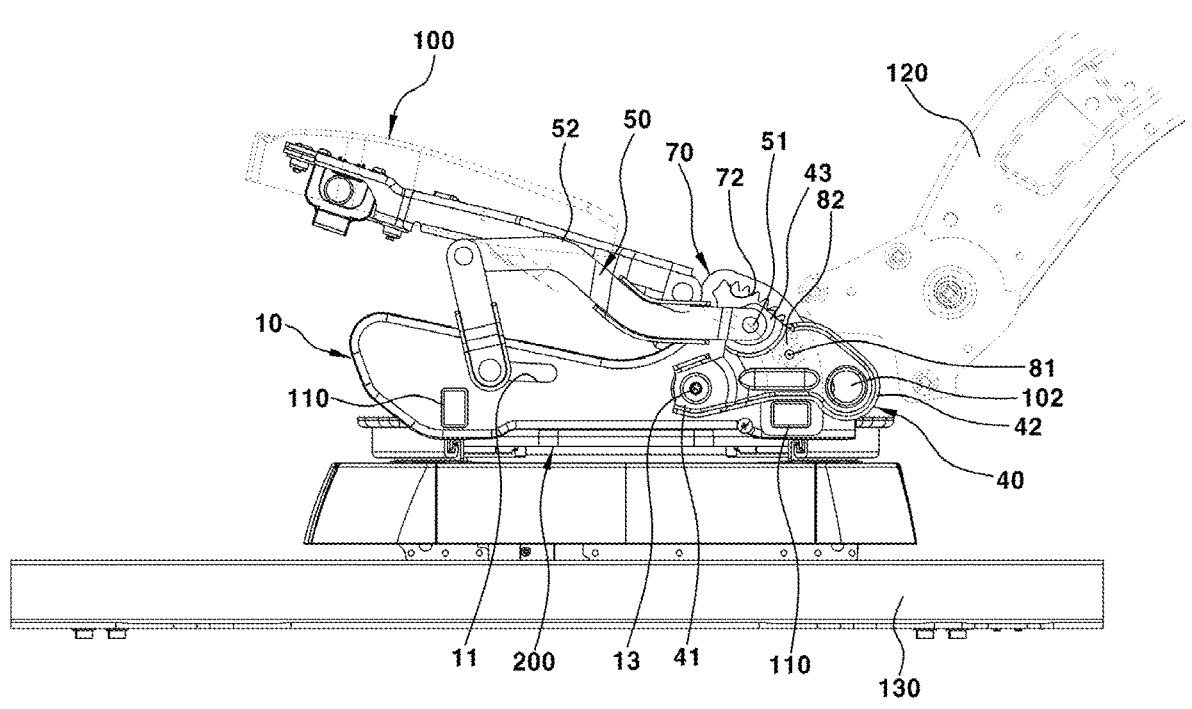
FIG. 9 is a side view showing an operation of implementing a relaxation posture of a seat by the vehicle seat device for assistance in entering and exiting the vehicle according to an embodiment of the present disclosure.

FIG. 8 is a side view showing a state in which the vehicle seat device for assistance in entering and exiting the vehicle according to an embodiment of the present disclosure is in a first configuration. FIG. 9 is a side view showing an operation of implementing a relaxation comport posture of a seat by the vehicle seat device for assistance in entering and exiting the vehicle according to an embodiment of the present disclosure.

First, referring to FIG. 8, in a state in which the seat cushion frame 100 and a seatback frame 120 can be positioned in the basic seating position, when the drive shaft 81 is rotated in one direction by driving of the motor 80, as shown in FIG. 9, the pinion 82 mounted on the drive shaft 81 may be moved downwards along the sector gear 72 of the guidance plate 70, and the drive shaft 81 can be also moved downwards with the pinion 82.

The end of the drive shaft 81 can be in a state of being rotatably inserted into the connection hole 44 of the driven link 40. Accordingly, when the drive shaft 81 is moved downwards, the rear end of the driven link 40 can be pulled downwards.

Therefore, the rear end of the driven link 40 may be rotated rearwards (clockwise in the direction shown in FIG. 9) while being moved downwards around the hinge pin 13.

Referring to FIG. 9, the rear end of the driven link 40 may be rotated rearwards while the second hinge coupling end 41 of the driven link 40 can be moved downwards around the hinge pin 13 serving as a point at which the second hinge coupling end 41 can be hinged to a selected, set, preset, or predetermined position of the rear outer surface of the first side bracket 10.

The drive shaft 81 can be in a state of passing through the guidance hole 32 of the drive link 30, and the first hinge coupling end 31 of the drive link 30 and the second hinge coupling end 41 of the driven link 40 can be in a state of being rotatably hinged to each other in the forward-and-rearward direction by the single hinge pin 13 with the first side bracket 10 interposed therebetween. Accordingly, when the rear end of the driven link 40 is moved downwards and rotated rearwards around the hinge pin 13, the drive link 30 may also be rotated in the same direction with the driven link 40 around the hinge pin 13.

Subsequently, the rear end of the tilting link 50 can be in a state of being fixedly mounted on the tilting link connection end 43 of the driven link 40 by the fixing pin 51. Accordingly, when the rear end of the driven link 40 is moved downwards and rotated rearwards around the hinge pin 13, the tilting link 50 can be also pulled rearwards and can be rotated rearwards (clockwise in the direction shown in FIG. 9).

The front end of the tilting link 50 can be located at a higher position than the rear end thereof, and the height of the convex support portion 52 of the tilting link 50 that supports the bottom of the seat cushion frame 100 can be lowered.

Further, the front end of the tilting link 50 can be in a state of being hinged to the upper end of the first guidance link 60. Accordingly, when the front end of the tilting link 50 pulls the upper end of the first guidance link 60 rearwards, the first guidance link 60 can be also rotated rearwards (clockwise in the direction shown in FIG. 9).

In addition, when the first guidance pin 61 coupled to the lower end of the first guidance link 60 is maximally moved toward a front portion of the first slide hole 11 formed in the first side bracket 10, the first guidance link 60 can be arranged in an almost erect state.

The connection pipe 102 mounted on the rear end of the seat cushion frame 100 can be in a state of being coupled to the seat cushion connection end 42 formed at the rear end of the driven link 40. Accordingly, when the rear end of the driven link 40 is moved downwards and rotated rearwards around the hinge pin 13, the connection pipe 102 can be pulled downwards, and simultaneously, the rear end of the seat cushion frame 100 can be also lowered.

Simultaneously, the height of the convex support portion 52 of the tilting link 50 that supports the bottom of the seat cushion frame 100 can increase and, as such, the front end of the seat cushion frame 100 can be moved upwards.

In addition, as described above with reference to FIG. 7, when the second guidance pin 91 coupled to the lower end of the second guidance link 90 is maximally moved toward a front portion of the second slide hole 12 formed in the second side bracket 20, the second guidance link 90 can be also arranged in an almost erect state.

Accordingly, the rear end of the seat cushion frame 100 can be moved downwards, and the front end of the seat cushion frame 100 can be moved upwards and, as such, the seat cushion frame 100 can be arranged to be tilted downwards from the front end toward the rear end.

Simultaneously, the seatback frame 120 connected to the seat cushion frame 100 can be also tilted rearwards.

In this manner, the seat cushion frame 100 can be arranged to be tilted downwards from the front end toward the rear end, and the seatback frame 120 can be tilted rearwards, thereby making it possible to implement a relaxation posture in which a passenger may rest comfortably.

Operation for Assistance in Entering and Exiting Vehicle

FIG. 10 is a side view showing an operation of implementing a seat posture for assistance in entering and exiting the vehicle by the vehicle seat device for assistance in entering and exiting the vehicle according to the present disclosure, and FIG. 11 is a schematic diagram showing an operation sequence of the vehicle seat device for assistance in entering and exiting the vehicle according to the present disclosure.

First, as shown in FIG. 11, a seat can be moved along the seat rail 130 to a selected, set, preset, or predetermined position of a front portion of the seat (for example, a position at which the door can be located).

The seat swivel device 200 can be in a state of being mounted on the seat rail 130 to be movable forwards and rearwards therealong. Accordingly, when the seat swivel device 200 can be moved forwards along the seat rail 130, the entire seat may be moved forwards.

Next, the seat can be rotated toward the door by driving of the seat swivel device 200.

Subsequently, when the drive shaft 81 can be rotated in the other direction by driving of the motor 80, as shown in FIG. 10, the pinion 82 mounted on the drive shaft 81 may be moved upwards along the sector gear 72 of the guidance plate 70, and the drive shaft 81 may also be moved upwards with the pinion 82.

The end of the drive shaft 81 can be in a state of being rotatably inserted into the connection hole 44 of the driven link 40. Accordingly, when the drive shaft 81 can be moved upwards, the rear end of the driven link 40 can be lifted upwards.

Accordingly, the rear end of the driven link 40 may be rotated forwards (counterclockwise in the direction shown in FIG. 10) while being lifted upwards around the hinge pin 13.

Referring to FIG. 10, the rear end of the driven link 40 may be rotated forwards while the second hinge coupling end 41 of the driven link 40 can be lifted upwards around the hinge pin 13 serving as a point at which the second hinge coupling end 41 can be hinged to a selected, set, preset, or predetermined position of the rear outer surface of the first side bracket 10.

Simultaneously, the drive shaft 81 can be in a state of passing through the guidance hole 32 of the drive link 30, and the first hinge coupling end 31 of the drive link 30 and the second hinge coupling end 41 of the driven link 40 can be in a state of being rotatably hinged to each other in the forward-and-rearward direction by the single hinge pin 13 with the first side bracket 10 interposed therebetween. Accordingly, when the rear end of the driven link 40 can be rotated forwards while being lifted upwards around the hinge pin 13, the drive link 30 may also be rotated in the same direction with the driven link 40 around the hinge pin 13.

Subsequently, the rear end of the tilting link 50 can be in a state of being fixedly mounted on the tilting link connection end 43 of the driven link 40 by the fixing pin 51. Accordingly, when the rear end of the driven link 40 can be rotated forwards while being lifted upwards around the hinge pin 13, the tilting link 50 can be also rotated forwards (counterclockwise in the direction shown in FIG. 10) while being pushed forwards.

Accordingly, the position of the front end of the tilting link 50 can be lowered than that of the rear end of the tilting link 50, thereby lowering the height of the convex support portion 52 of the tilting link 50 that supports the bottom of the seat cushion frame 100.

Simultaneously, the front end of the tilting link 50 can be in a state of being hinged to the upper end of the first guidance link 60. Accordingly, when the front end of the tilting link 50 pushes the upper end of the first guidance link 60 forwards, the first guidance link 60 can be also rotated forwards (counterclockwise in the direction shown in FIG. 10).

In addition, the first guidance pin 61 coupled to the lower end of the first guidance link 60 can be maximally moved toward a rear portion of the first slide hole 11 formed in the first side bracket 10, thereby arranging the first guidance link 60 in a state of being laid down almost horizontally.

The connection pipe 102 mounted on the rear end of the seat cushion frame 100 can be in a state of being coupled to the seat cushion connection end 42 formed at the rear end of the driven link 40. Accordingly, when the rear end of the driven link 40 can be rotated forwards while being lifted upwards around the hinge pin 13, the connection pipe 102 can be lifted upwards, and the rear end of the seat cushion frame 100 can be also lifted upwards.

Simultaneously, when the height of the convex support portion 52 of the tilting link 50 that supports the bottom of the seat cushion frame 100 can be lowered, the front end of the seat cushion frame 100 can be moved downwards.

In addition, as described above with reference to FIG. 7, the second guidance pin 91 coupled to the lower end of the second guidance link 90 can be maximally moved toward a rear portion of the second slide hole 12 formed in the second side bracket 20, thereby arranging the second guidance link 90 in a state of being laid down almost horizontally.

Accordingly, the rear end of the seat cushion frame 100 can be lifted upwards, and the front end of the seat cushion frame 100 sags downwards. In this manner, the seat cushion frame 100 can be arranged to be tilted downwards from the rear end toward the front end.

Simultaneously, the seatback frame 120 connected to the seat cushion frame 100 can be also tilted forwards.

In this manner, after a seat swivel operation of rotating the seat toward the door can be performed, the seat cushion frame 100 can be arranged to be tilted downwards from the rear end toward the front end, and the seat back frame 120 can be tilted forwards, thereby performing assistance in allowing a passenger to conveniently enter and exit the vehicle.

First, to allow a passenger to comfortably rest and sleep during long distance driving, a relaxation posture may be implemented by a seat cushion tilting operation of moving the front end of a seat cushion upwards and a seatback reclining operation of tilting a seatback rearwards.

Second, the passenger may conveniently enter and exit the vehicle through a seat swivel operation of rotating a seat toward the door and a vehicle-entering-and-exiting assistance operation of lowering the front end of the seat cushion.

Third, a configuration of a seat relaxation operation and a configuration of a seat operation for assistance in entering and exiting the vehicle can be integrated with each other, thereby reducing weight and the number of parts and improving seat assembly performance.

The present disclosure has been described in detail with reference to embodiments thereof. However, it can be appreciated by those skilled in the art that changes may be made in these embodiments without departing from the principles and spirit of the disclosure, the scope of which can be defined in the appended claims and equivalents thereto.

What is claimed is:

1. A vehicle seat device for assistance in entering and exiting a vehicle, the vehicle seat device comprising:
   a first side bracket and a second side bracket respectively mounted on opposite sides of a rotating plate of a seat swivel device;
   a first guidance link having a lower end coupled to a front portion of the first side bracket to be movable forwards and rearwards;
   a drive link having a first hinge coupling end hinged to a rear inner surface of the first side bracket by a hinge pin;
   a driven link having a second hinge coupling end hinged to a rear outer surface of the first side bracket by the hinge pin;
   a tilting link having a front end hinged to an upper end of the first guidance link and a rear end connected to the driven link;
   a guidance plate having a guidance hole including a sector gear protruding from one inner surface thereof, the guidance plate being fixedly mounted at the rear outer surface of the first side bracket; and
   a drive device connected to the drive link, the guidance plate, and the driven link and configured to rotate the drive link, the driven link, and the tilting link forwards or rearwards about the hinge pin.

2. The device of claim 1, wherein the front portion of the first side bracket has a first slide hole configured to allow a first guidance pin mounted on a lower end of the first guidance link to be slidably and rotatably coupled thereto, and wherein the first guidance pin is movable forwards and rearwards in the first slide hole.

3. The device of claim 1, wherein the first hinge coupling end is at a front end of the drive link, and the second hinge coupling end is at a front end of the driven link.

4. The device of claim 1, wherein the first hinge coupling end of the drive link and the second hinge coupling end of the driven link are hinged to each other by the hinge pin with the first side bracket interposed therebetween.

5. The device of claim 1, wherein the driven link has a seat cushion connection end formed at a rear end thereof and coupled to a connection pipe mounted on a rear end of a seat cushion frame.

6. The device of claim 1, wherein the driven link has a tilting link connection end at an upper end thereof and configured to allow a rear end of the tilting link to be mounted thereon by a fixing pin.

7. The device of claim 1, wherein the drive device comprises:
   a motor mounted on an inner surface of the drive link;
   a drive shaft extending from an output portion of the motor, wherein the drive shaft passes through the guidance hole of the guidance plate and is rotatably coupled to the driven link; and
   a pinion mounted on the drive shaft and engaged with the sector gear of the guidance plate.

8. The device of claim 7, wherein the drive link has a guidance hole formed to allow the drive shaft to pass therethrough.

9. The device of claim 7, wherein the driven link has a connection hole configured to allow an end of the drive shaft to be rotatably inserted thereinto.

10. The device of claim 1, further comprising a second guidance link having a lower part coupled to a front portion of the second side bracket, wherein the lower part is coupled thereto to be movable forwards and rearwards, and an upper part hinged to a side of a seat cushion frame.

11. The device of claim 10, wherein the front portion of the second side bracket has a second slide hole, wherein the second guidance link has a second guidance pin mounted on a lower end of the second guidance link, wherein the second guidance pin is slidably and rotatably coupled to the second slide hole, and wherein the second guidance pin is movable forwards and rearwards in the second slide hole.

12. The device of claim 1, wherein each of the first side bracket and the second side bracket is fixedly mounted on a corresponding one of opposite sides of a base frame mounted on the rotating plate of the seat swivel device.

13. The device of claim 12, wherein the seat swivel device is mounted on a seat rail to be movable forwards and rearwards along the seat rail.

14. A vehicle seat device for assistance in entering and exiting a vehicle, the vehicle seat device comprising:
  a first side bracket and a second side bracket respectively mounted on opposite sides of a rotating plate of a seat swivel device;
  a first guidance link having a lower end coupled to a front portion of the first side bracket to be movable forwards and rearwards;
  a drive link having a first hinge coupling end hinged to a first position of a rear inner surface of the first side bracket by a hinge pin;
  a driven link having a second hinge coupling end hinged to a second position of a rear outer surface of the first side bracket by the hinge pin;
  a tilting link having a front end hinged to an upper end of the first guidance link and a rear end connected to the driven link;
  a guidance plate having a guidance hole including a sector gear protruding from one inner surface thereof, the guidance plate being fixedly mounted at the second position of the rear outer surface of the first side bracket; and
  a drive device connected to the drive link, the guidance plate, and the driven link and configured to rotate the drive link, the driven link, and the tilting link forwards or rearwards about the hinge pin, wherein the first side bracket has a first slide hole therethrough at a third position of a front portion thereof and configured to allow a first guidance pin mounted on a lower end of the first guidance link to be slidably and rotatably coupled thereto, wherein the first guidance pin is movable forwards and rearwards in the first slide hole, wherein the first hinge coupling end is at a front end of the drive link, and the second hinge coupling end is at a front end of the driven link, wherein the first hinge coupling end of the drive link and the second hinge coupling end of the driven link are hinged to each other by the hinge pin with the first side bracket interposed therebetween, wherein the driven link has a seat cushion connection end formed at a rear end thereof and coupled to a connection pipe mounted on a rear end of a seat cushion frame, wherein the driven link has a tilting link connection end at an upper end thereof and configured to allow a rear end of the tilting link to be mounted thereon by a fixing pin.

15. The device of claim 14, wherein the drive device comprises:
  a motor mounted on an inner surface of the drive link;
  a drive shaft extending from an output portion of the motor, wherein the drive shaft passes through the guidance hole of the guidance plate and is rotatably coupled to the driven link; and
  a pinion mounted on the drive shaft and engaged with the sector gear of the guidance plate.

16. The device of claim 15, wherein the drive link has a guidance hole formed to allow the drive shaft to pass therethrough.

17. The device of claim 15, wherein the driven link has a connection hole configured to allow an end of the drive shaft to be rotatably inserted thereinto.

18. The device of claim 14, further comprising a second guidance link having a lower part coupled to a fourth position of a front portion of the second side bracket, wherein the lower part is coupled thereto to be movable forwards and rearwards, and an upper part hinged to a side of the seat cushion frame, wherein the second side bracket has a second slide hole therethrough at a fifth position of a front portion thereof, wherein the second guidance link has a second guidance pin mounted on a lower end thereof being slidably and rotatably coupled to the second slide hole, wherein the second guidance pin is movable forwards and rearwards in the second slide hole, wherein each of the first side bracket and the second side bracket is fixedly mounted on a corresponding one of opposite sides of a base frame mounted on the rotating plate of the seat swivel device, and wherein the seat swivel device is mounted on a seat rail to be movable forwards and rearwards along the seat rail.

19. A vehicle seat device for assistance in entering and exiting a vehicle, the vehicle seat device comprising:
  a first side bracket and a second side bracket respectively mounted on opposite sides of a rotating plate of a seat swivel device;
  a first guidance link having a lower end coupled to a front portion of the first side bracket to be movable forwards and rearwards;
  a drive link having a first hinge coupling end hinged to a first position of a rear inner surface of the first side bracket by a hinge pin;
  a driven link having a second hinge coupling end hinged to a second position of a rear outer surface of the first side bracket by the hinge pin;
  a tilting link having a front end hinged to an upper end of the first guidance link and a rear end connected to the driven link;
  a guidance plate having a guidance hole including a sector gear protruding from one inner surface thereof, the guidance plate being fixedly mounted at the second position of the rear outer surface of the first side bracket;
  a drive device connected to the drive link, the guidance plate, and the driven link and configured to rotate the drive link, the driven link, and the tilting link forwards or rearwards about the hinge pin, wherein the first side bracket has a first slide hole therethrough at a third position of a front portion thereof and configured to allow a first guidance pin mounted on a lower end of the first guidance link to be slidably and rotatably coupled thereto, wherein the first guidance pin is movable forwards and rearwards in the first slide hole, wherein the first hinge coupling end is at a front end of the drive link, and the second hinge coupling end is at a front end of the driven link, wherein the first hinge coupling end of the drive link and the second hinge coupling end of the driven link are hinged to each other by the hinge pin with the first side bracket interposed therebetween, wherein the driven link has a seat cushion connection end formed at a rear end thereof and coupled to a connection pipe mounted on a rear end of a seat cushion frame, wherein the driven link has a tilting link connection end at an upper end thereof and configured to allow a rear end of the tilting link to be mounted thereon by a fixing pin;

a motor mounted on an inner surface of the drive link;

a drive shaft extending from an output portion of the motor, wherein the drive shaft passes through the guidance hole of the guidance plate and is rotatably coupled to the driven link;

a pinion mounted on the drive shaft and engaged with the sector gear of the guidance plate, wherein the drive link has a guidance hole formed to allow the drive shaft to pass therethrough, wherein the driven link has a connection hole configured to allow an end of the drive shaft to be rotatably inserted thereinto; and a second guidance link having a lower part coupled to a fourth position of a front portion of the second side bracket, wherein the lower part is coupled thereto to be movable forwards and rearwards, and an upper part hinged to a side of the seat cushion frame, wherein the second side bracket has a second slide hole therethrough at a fifth position of a front portion thereof, wherein the second guidance link has a second guidance pin mounted on a lower end thereof being slidably and rotatably coupled to the second slide hole, wherein the second guidance pin is movable forwards and rearwards in the second slide hole, wherein each of the first side bracket and the second side bracket is fixedly mounted on a corresponding one of opposite sides of a base frame mounted on the rotating plate of the seat swivel device, and wherein the seat swivel device is mounted on a seat rail to be movable forwards and rearwards along the seat rail.

\* \* \* \* \*